Sept. 27, 1932. E. MUTH 1,879,944
APPARATUS FOR CONVEYING GOODS IN BALES, SACKS, OR THE LIKE
Filed Oct. 8, 1931
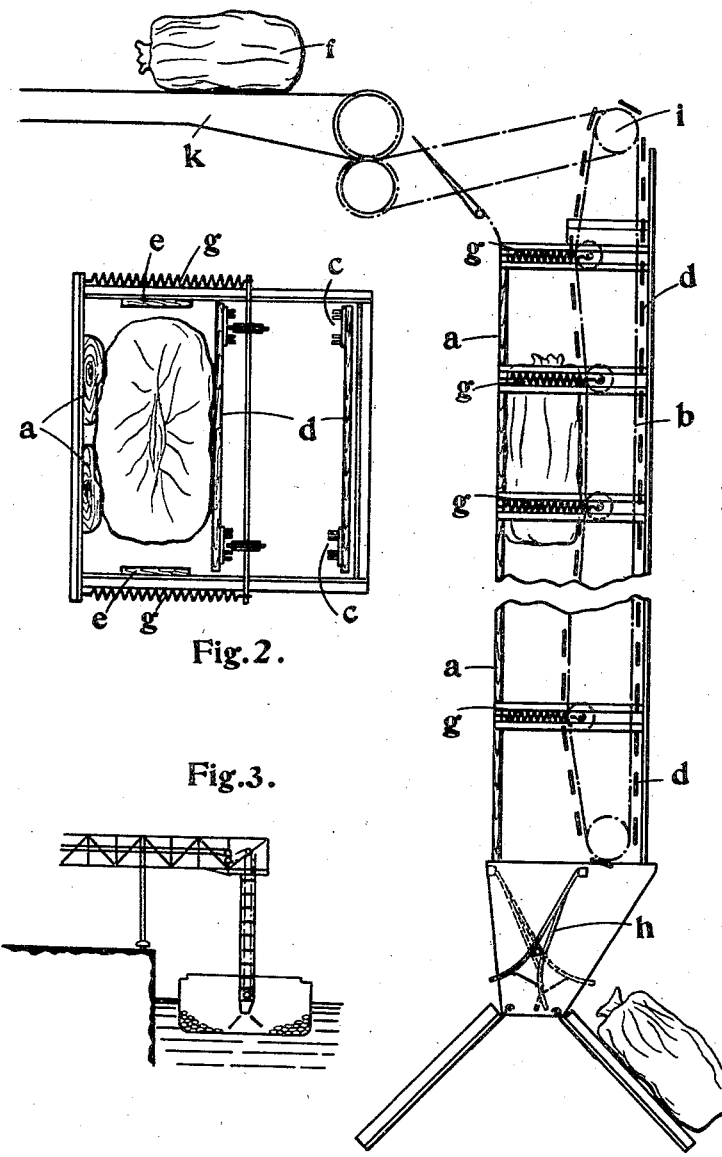
Inventor
E. Muth:
by
W. E. Evans
Attorney.

Patented Sept. 27, 1932

1,879,944

UNITED STATES PATENT OFFICE

EMIL MUTH, OF SAARBRUCKEN, GERMANY

APPARATUS FOR CONVEYING GOODS IN BALES, SACKS, OR THE LIKE

Application filed October 8, 1931, Serial No. 567,653, and in Belgium September 2, 1931.

Hitherto goods in bulk have been conveyed in a vertical or steeply inclined direction by means of elevators or paternosters or similar continuously moving raising apparatus in which the articles being moved rest upon suitably disposed platforms or supporting brackets. Such apparatus has the disadvantage that the articles to be conveyed can be carried to the conveyor only when a platform or a supporting bracket is at the height for delivery. A further disadvantage of such apparatus is that they consist of a relatively large number of moving parts which cause frequent stoppages. The present invention relates to apparatus for conveying goods in bulk in bales, sacks or the like in the downward direction, thus avoiding the disadvantages hereinbefore referred to. According to the invention the goods are pressed by springs between a stationary slide surface and a rotating endless conveyor and carried along according to the movement of the conveyor.

The stationary slide surface may advantageously have a profile such that it approximates in cross-section to the shape of the contacting surfaces of the sacks, bales or the like which are to travel over it. The goods in bulk to be conveyed are thus on the one hand laterally guided while on the other hand the frictional resistance is increased.

In order that the conveyor may be economical in use and the goods delivered in a simple manner to both sides, a rotatable shoot is provided at the bottom of the apparatus that it is automatically reversed by the goods, which are discharged in both directions alternately.

In order that bales or sacks of different dimensions may be conveyed by means of the apparatus according to the invention it is advantageous to provide the revolving conveyor capable of adjustment laterally and to provide the springs producing the pressure adjustable in length. The conveying mechanism may be constructed of rotatable tension members such as chains or ropes connected together by transverse bars.

In this way the conveyor is automatically adapted to the shape of the bale, sack or the like, thereby preventing the goods from slipping.

In order to utilize the forces which are generated in the downward movement it is furthermore proposed to couple the device for letting down the goods to the supply conveyor and thus assist the working of the latter.

The accompanying drawing diagrammatically illustrates one example of the apparatus according to the invention.

Figure 1 is a side elevation of the apparatus showing also the supply conveyor;

Figure 2 is a sectional plan, and

Figure 3 is a general view of the apparatus showing the supply conveyor.

The example illustrated is an apparatus for loading ships and barges.

$a$ is the stationary slide surface.

$b$ is an endless conveyor which may consist for example of separate chains $c$ provided with transverse bars $d$; any other suitable endless conveyor may, however, be employed.

$e$ are lateral guide bars.

The bales or sacks $f$ are pressed by springs $g$ between the conveyor $d$ and the stationary slide surface $a$ and slide downwardly corresponding to the movement of the conveyor.

At the bottom a rotatable shoot $h$ is provided which according to the drawing is so constructed that it is reversed automatically by the sack or the like, and discharges the goods on alternate sides.

With a view to utilizing the waste energy generated by the downwardly supplied goods, it is advisable to couple the upper guide roller $i$ of the conveyor $b$ to the supply conveyor $k$ thus assisting in the work of driving the latter.

By means of the apparatus hereinbefore described, which needs very little space and driving power, the goods in bulk may be conveyed in simple manner in a vertical line or on a steep slope. The staff is reduced to a minimum and only at the discharge point at the bottom is an operator necessary, as the lowering apparatus can be automatically charged, by reason of the special arrangement of the parts by the supply conveyor. The apparatus is particularly suitable for loading ships, as owing to its small dimensions it can be let down through the narrow ships hatches.

I claim:

1. Apparatus for the substantially vertical downward conveyance of goods in bales, sacks and the like, comprising a slide surface of fixed position, an opposed endless conveyor, one side of which is juxtaposed to the slide surface, and means for drawing said juxtaposed side of the conveyor towards the slide surface with pressure, the sacks or bales being caused to pass between the slide surface and the conveyor and to travel downwardly under gravity.

2. Apparatus for the substantially vertical downward conveyance of goods in sacks, bales and the like, according to claim 1, provided with a slide surface consisting of a number of juxtaposed rails of a cross-sectional shape to form the slide surface approximately to the shape of the sacks, bales and the like.

3. Apparatus for the substantially vertical downward conveyance of goods in sacks, bales and the like, according to claim 1, having an endless conveyor comprising a plurality of endless flexible tension members connected together at intervals by transverse bars.

4. Apparatus for the substantially vertical downward conveyance of goods in bales, sacks and the like, comprising a slide surface of fixed position, an opposed endless conveyor, one side of which is juxtaposed to the slide surface, the said conveyor comprising a plurality of endless flexible members and transverse bars, and means for drawing said juxtaposed side of the conveyor towards the slide surface with pressure, comprising a plurality of pairs of springs, transverse spindles outside the operative side of the conveyor, said springs being anchored between the slide surface and the transverse spindles and runners upon said spindles to engage the endless flexible members, the sacks or bales being caused to pass between the slide surface and the conveyor and to travel downwardly under gravity under control of the pressure exerted by the conveyor.

5. Apparatus for the substantially vertical downward conveyance of goods in bales, sacks and the like, according to claim 4, in which the springs are adapted for adjustment in length.

6. Apparatus for the substantially vertical downward conveyance of goods in bales, sacks and the like, according to claim 4, provided with an endless supply conveyor, a charging chute by which the bales, sacks and the like pass from the charging conveyor to the apparatus, and a flexible drive from the conveyor of the apparatus to the supply conveyor to transmit motion resulting from the movement under gravity of the bales, sacks and the like to the supply conveyor.

EMIL MUTH.